United States Patent [19]

Wirges

[11] Patent Number: 4,784,375
[45] Date of Patent: Nov. 15, 1988

[54] STEPLESSLY BLOCKABLE SETTING DEVICE

[75] Inventor: Winfried Wirges, Koblenz, Fed. Rep. of Germany

[73] Assignee: Stabilus GmbH, Koblenz-Neuendorf, Fed. Rep. of Germany

[21] Appl. No.: 86,856

[22] Filed: Aug. 19, 1987

[30] Foreign Application Priority Data

Aug. 28, 1986 [DE] Fed. Rep. of Germany ....... 3629250

[51] Int. Cl.$^4$ ............................. F16F 5/00; E05F 3/04; E05F 3/12
[52] U.S. Cl. .................................. 267/64.12; 188/319; 188/300
[58] Field of Search ................... 188/300, 280, 322.17, 188/284, 319; 248/631, 404, 562; 267/64.12; 137/443.9

[56] References Cited

U.S. PATENT DOCUMENTS

| Re. 29,497 | 12/1977 | Freitag | 188/322.17 |
|---|---|---|---|
| 3,108,610 | 10/1963 | De See | 137/493 |
| 3,762,514 | 10/1973 | Freitag | 188/280 |
| 3,828,651 | 8/1974 | Dorner et al. | 188/300 |
| 4,257,582 | 3/1981 | Wirges | 188/300 |

FOREIGN PATENT DOCUMENTS

| 0115209 | 8/1984 | European Pat. Off. |
|---|---|---|
| 1625465 | 5/1970 | Fed. Rep. of Germany |
| 2022609 | 11/1971 | Fed. Rep. of Germany |
| 1554479 | 7/1972 | Fed. Rep. of Germany |
| 2659491 | 7/1978 | Fed. Rep. of Germany |
| 8500855 | 5/1985 | Fed. Rep. of Germany |
| 3519203 | 7/1986 | Fed. Rep. of Germany |

*Primary Examiner*—Douglas C. Butler
*Assistant Examiner*—Mark T. Le
*Attorney, Agent, or Firm*—Brumbaugh, Graves, Donohue & Raymond

[57] ABSTRACT

A hydropneumatic spring usable as steplessly blockable setting device comprises a by-pass connection in its piston. In this by-pass connection there is arranged a shut-off valve actuatable from the exterior. Furthermore the by-pass connection can be opened by excess pressure in each of the two working chambers. In this way the setting of length of the hydropneumatic spring can be altered by predetermined inward and/or outward thrust forces even when the shut-off valve is closed.

22 Claims, 4 Drawing Sheets

STEPLESSLY BLOCKABLE SETTING DEVICE

BACKGROUND OF THE INVENTION

The invention relates to a steplessly blockable device comprising a cylinder with a cylinder axis, a cavity, a cylinder inner surface and two end walls, a piston rod conducted in sealing manner through at least one of the end walls and movable in the direction of the cylinder axis in relation to the cylinder, a piston unit connected within the cylinder with the piston rod, which unit rests in sealing manner on the cylinder inner surface and divides the cavity within the cylinder into two working chambers, a fluid filling in the working chambers, a by-pass connection connecting the two working chambers with one another, and a shut-off valve arrangement, actuatable from the exterior of the cylinder, in the by-pass connection.

Such setting devices are used for example for setting doors or flaps into desired open positions. In order to effect the setting, the shut-off valve is opened. When the desired setting is reached, the shut-off valve is closed again so that then the door or flap is made fast. It can occur that a closing or opening force is exerted upon the door or flap without the shut-off valve being opened. Then extremely high forces occur on the setting device and on the mounting of the door or flap. In that case deformations can easily occur to the setting device and/or to the mounting of the door or flap. Under some circumstances the piston rod can be torn violently out of the piston.

EXPLANATION OF THE PRIOR ART

From Fed. German P.S. No. 1,554,479 a steplessly blockable setting device is known which comprises a fluid-filled cylinder on the inner wall of which a piston connected with a piston rod is guided in sealing manner. The cylinder interior is divided by the piston into two working chambers and these two working chambers are connectable with one another by means of a blocking valve actuatable from the exterior. The fluid present in the cylinder interior is in this case under pressure and exerts an outward thrust force upon the piston rod when the blocking valve is opened.

A further steplessly blockable setting device is known from Fed. German Utility Model No. 8 500855, in which no outward thrust force of any kind is exerted upon the piston rod. For the compensation of the temperature caused fluid expansion at least one working chamber has a limitation by an axially movable partition which is arranged resting on an abutment face of a resilient compensation body.

From Fed. German O.S. No. 2,659,491 a gas spring is known which comprises an arresting system acting pressure-dependently in the inward thrust movement of the piston rod into the cylinder. A blocking valve actuatable according to choice from the exterior is not present in this gas spring which serves for the partial compensation of the weight of a motor vehicle boot lid.

OBJECT OF THE INVENTION

The object of the present invention is to produce a steplessly blockable setting device which avoids damage to the components even in the case of an error in the operation of the shut-off valve for actuation from the exterior; at the same time the setting device is to be simple in construction and to permit simple assembly.

THE ESSENCE OF THE INVENTION

The invention is based upon a steplessly blockable setting device comprising a cylinder with a cylinder axis, a cavity, a cylinder inner surface and two end walls, a piston rod conducted in sealing manner through at least one of the end walls and movable in relation to the cylinder in the direction of the cylinder axis, a piston unit connected within the cylinder with the piston rod, which unit rests in sealing manner on the cylinder inner surface and divides the cavity within the cylinder into two working chambers, a fluid filling in the working chambers, a by-pass connection connecting the two working chambers with one another and a shut-off valve arrangement, actuatable from the exterior of the cylinder, in the by-pass connection. With regard to the object as formulated above it is here provided that the by-pass connection is openable in response to excess pressure in at least one of the working chambers. By reason of the opening of the by-pass connection in the case of excess pressure a high functional reliability is achieved, since if the shut-off valve is not opened, as from a predetermined pressure difference between the working chambers of the setting device the effect is obtained that the forces acting upon the piston rod cannot rise further. Especially when such a setting device is used as door fixer for motor vehicles the setting device can be made as small as possible and with low weight.

A setting device according to the invention is preferably formed in a manner in which a valve chamber with a valve chamber axis and a valve chamber circumferential surface is provided, coaxially with the valve chamber a valve body is accommodated displaceably therein, this valve body comprises a valve head with an external circumferential surface of larger diameter and a prolongation with an external circumferential surface of smaller diameter, a sealing ring unit resting in sealing manner on the valve chamber circumferential surface is arranged radially between the valve body in the valve chamber circumferential surface, the valve body is axially biased into a basic position determined by a valve stop, the sealing ring unit is axially biased into a basic position determined by a sealing stop, when the valve body and the sealing ring unit are in their basic positions the valve head rests with its external circumferential surface in sealing manner on the sealing ring unit, the valve body is displaceable out of its basic position into an open position in which the external circumferential surface of the prolongation has approached the sealing ring unit and the sealing ring unit is displaceable out of its basic position into an open position in which it has approached the external circumferential surface of the prolongation. In this form of embodiment the valve body can be shifted out of its basic position firstly by external force action and secondly by excess pressure in the one of the working chambers. It here acts as a first safety valve. For the other part the sealing ring unit can be shifted out by excess pressure in the other of the working chambers. It then acts as second safety valve. Thus a safety valve is provided for each direction of movement of the piston rod in relation to the cylinder, which valve opens as from a predetermined force action even if the shut-off valve is closed.

The setting device of such formation is especially simple in construction because the functions of a shut-off valve and two safety valves are taken over by one single valve body and one single sealing ring unit. The biasing action on the valve body and the sealing ring unit in the direction towards their respective basic positions can be taken over wholly or partially by the pressures in the working chambers. However it is also possible to allocate a valve spring to the valve body and a sealing spring to the sealing ring unit, which load the valve body and the sealing ring unit respectively in the direction towards their respective basic positions. By suitable selection of this valve spring and this sealing spring it is possible easily to set the response pressures, at which the by-pass connection opens automatically, to the value desired in each case.

The shut-off valve can be accommodated especially within the piston unit, so that a setting device of small construction and simple external form is obtained.

The various features of the invention are discussed especially in the accompanying claims which form a part of the disclosure. For the better understanding of the invention, its working advantages and specific effects reference is now made to the accompanying drawings and the description, in which preferred forms of embodiment of the invention are discussed.

BRIEF DESCRIPTION OF THE DRAWINGS

The invention will be explained in greater detail below by reference to the form of embodiment as represented in the drawing, wherein.

DESCRIPTION OF THE PREFERRED FORM OF EMBODIMENT

Figure 1:
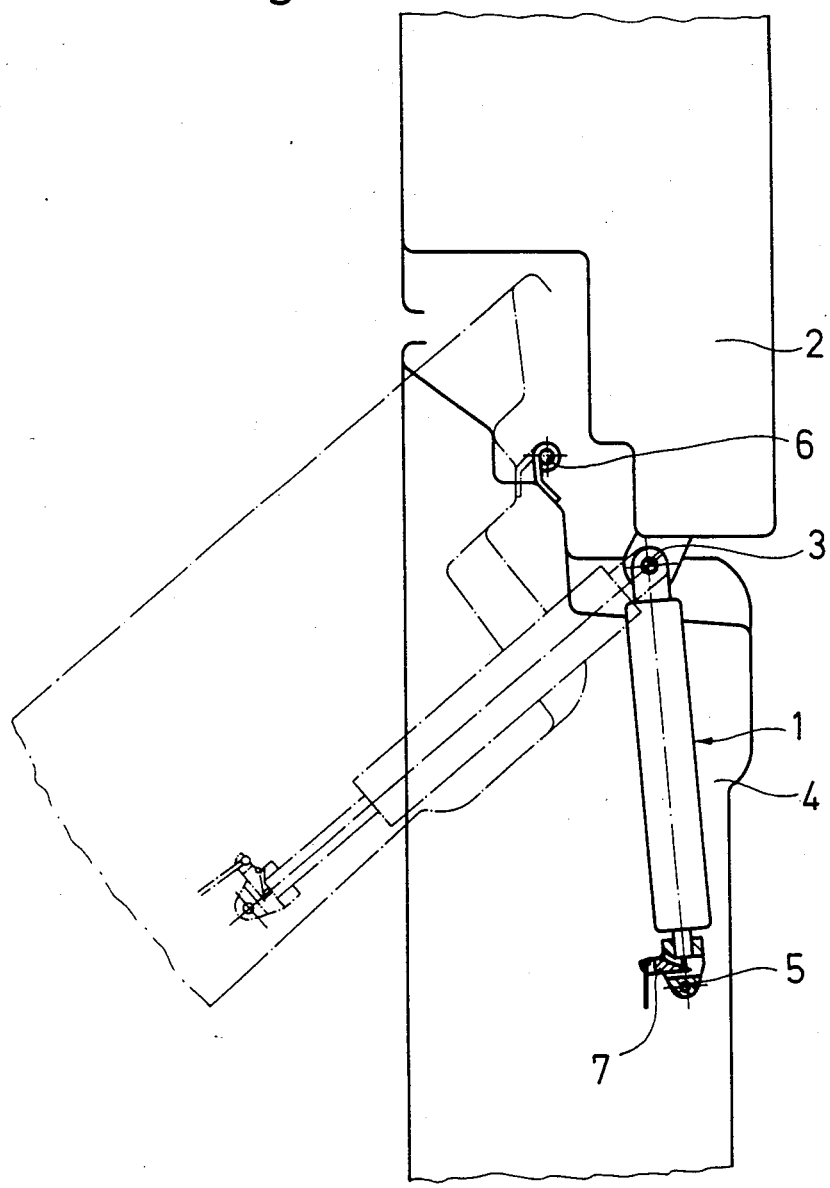
FIG. 1 shows the situation of installation of the steplessly blockable setting device as door fixer for motor vehicle doors, in diagrammatic representation.

In FIG. 1 the steplessly blockable setting device 1 is pivotably secured by means of a joint eye fast with the cylinder on a bearing bolt 3 connected with the bodywork 2, while a bearing bolt 5 firmly connected with a door 4 forms the pivot bearing for a component secured on the piston rod and accommodating a release device 7 for a shut-off valve actuatable from the exterior. This release device 7 can be actuated through a draw cable or other suitable means. The door 4 of the motor vehicle is mounted by means of a door hinge 6 in the bodywork 2 and on actuation pivots about a vertical or nearly vertical axis. In the opening and closing of the door the release device 7 is actuated by the door handle and opens the shut-off valve, while after the door handle is released the shut-off valve closes and the door 4 is held fast in the desired position.

Figure 2:
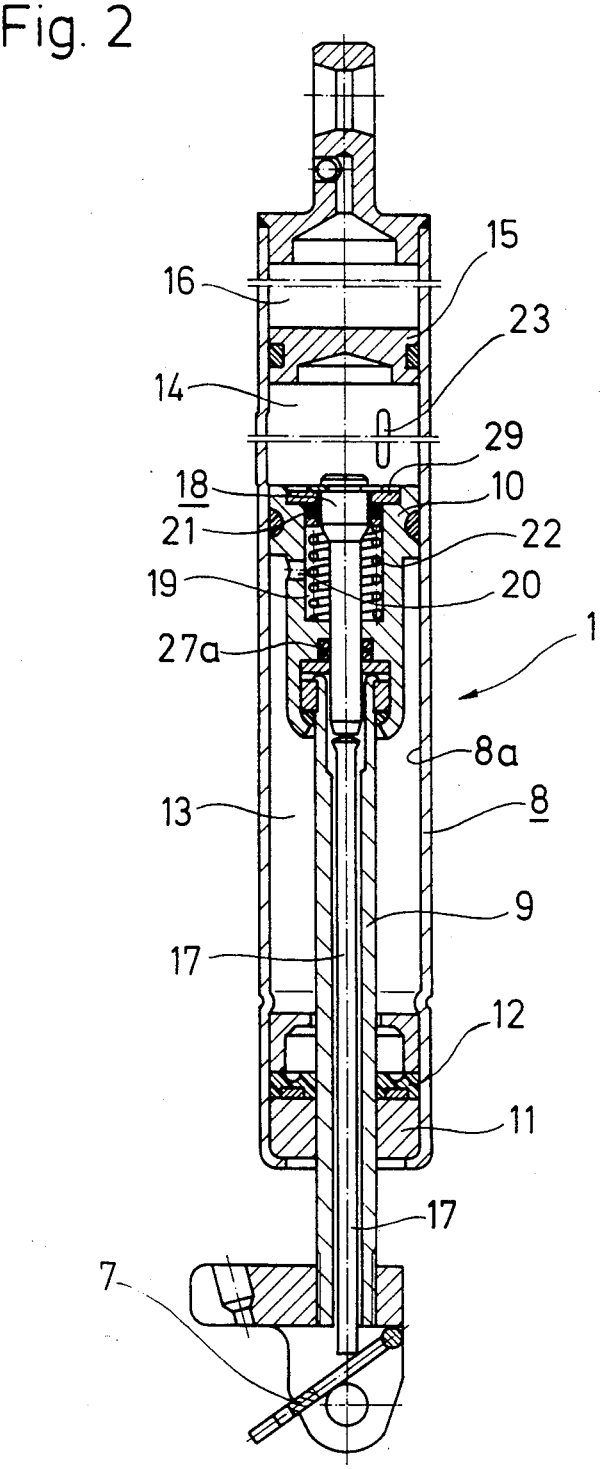
FIG. 2 shows the steplessly blockable setting device according to FIG. 1 in longitudinal section.

FIG. 2 shows the steplessly blockable setting device 1 which consists of a cylinder 8 on the cylindrical inner surface 8a of which a piston unit 10 connected with a piston rod 9 is guided in sealing manner. This piston unit 10 divides the liquid filled interior of the cylinder 8 into the working chamber 13 on the piston rod side and the working chamber 14 remote from the piston rod, the piston rod 9 being guided by means of a piston rod guide 11 and sealed to the exterior by a piston rod seal 12 at the piston rod exit end of the cylinder 8. In the interior of the cylinder 8 there is also a spring chamber 16 provided with a gas filling under pressure, which is sealed off from the working chamber 14 remote from the piston rod by a separator piston 15, and the liquid filling in the working chambers 13 and 14 is loaded by the gas pressure in the spring chamber 16. The piston rod 9 and the piston unit 10 form a construction group 9, 10. Within this construction group 9, 10 a valve chamber 19 is accommodated which comprises a valve chamber end face 19a, a valve chamber circumferential surface 19b and a valve chamber opening 19c. A valve body 18 comprising a valve head 25 and a valve shank 27 is accommodated in the valve chamber 19. The valve head 25 possesses a cylindrical external circumferential surface of larger diameter and the valve shank 27 possesses a cylindrical external circumferential surface of smaller diameter. The valve head 25 and the valve shank 27 merge into one another by way of a conical connection surface 26. The valve shank 27 is conducted through the valve chamber end face 19a through the intermediary of a seal 27a into the bore 9a of the piston rod 9. The bore 9a of the piston rod 9 is in communication with atmospheric pressure.

A stop ring 29 penetrated by the valve head 25 is inserted into the valve chamber opening 19c. The valve head 25 is equipped with a slotted ring 28 which rests against the stop ring 29. A sealing ring 21 is accommodated between the external circumferential surface of the valve head 25 and the valve chamber inner surface 19b. This sealing ring 21 rests in sealing manner on the external circumferential surface of the valve head 25 and likewise in sealing manner on the valve chamber circumferential surface 19b. The sealing ring 21 is pressed against the stop ring 29 by a sealing spring 22 which bears on the valve chamber end face 19a, and by a presser washer 24.

The upper end of the valve head 25 is subjected to the pressure in the working chamber 14. For this purpose the ring 28 is provided with a relatively wide slot. The valve chamber 19 is connected by a radial bore 20 with the working chamber 13 so that the same pressure prevails in the valve chamber 19 as in the working chamber 13. The pressure in the working chamber 14 acts upon the cross-section of the valve head 25. The pressure in the working chamber 13 acts upon the conical transition surface 26. Since the cross-section of the valve head 25 is larger than the cross-section of the valve shank 27, the valve body 18 is pressed against the stop ring 29—as long as the pressures in the working chambers 13 and 14 are approximately equal. Thus the by-pass connection 19c, 19, 20 between the two working chambers 13 and 14 is closed. If no external force acts upon the cylinder 8 and the piston rod 9, the piston unit 10 is held in a position of equilibrium where the pressure in the working chamber 13 is greater than the pressure in the working chamber 14 in accordance with the cross-sectional difference between the working chamber 14 and the working chamber 13 which is determined by the cross-section of the piston rod 9. If the setting of the piston rod 9 in relation to the cylinder 8 is to be changed, the valve body 18 is pressed upwards by the valve plunger 17 until the conical transition surface 26 comes into the region of the sealing ring 21. Then the by-pass connection 19c, 19, 20 is opened and the piston rod 9 can be shifted in relation to the cylinder 8, the position of the separator piston 15 being varied in accordance with the variation of the volume of the piston rod 9 within the cylinder 8.

Figure 3:
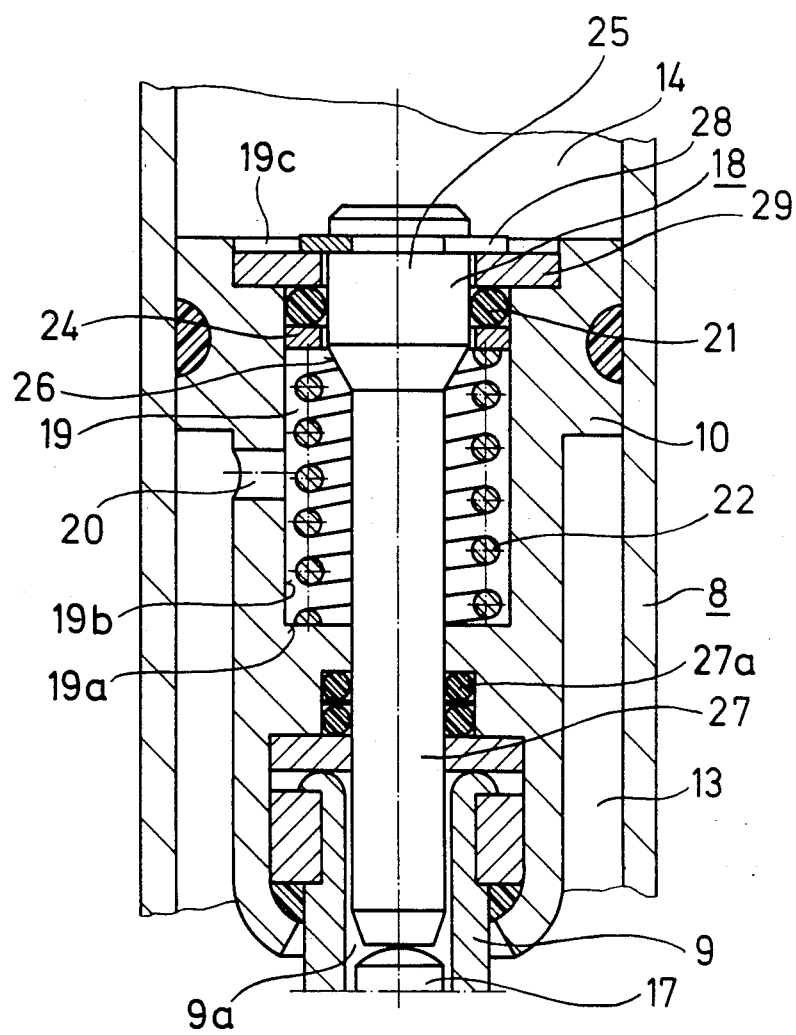
FIG. 3 shows the region of the piston according to FIG. 2 in enlarged representation.

If with the shut-off valve in the position according to FIG. 3 the piston rod 9 is pushed into the cylinder 8, a pre-determined force being exerted, the pressure in the working chamber 14 rises in such a way that the sealing ring 21 is displaced downwards against the action of the sealing spring 22 in FIG. 3 and comes into the region of the conical transition surface 26. Then the by-pass connection 19c, 19, 20 is likewise opened and the piston rod 9 can be displaced in relation to the cylinder 8.

If with the shut-off valve in the position according to FIG. 3 the piston rod 9 is drawn with a predetermined force out of the cylinder 8, the pressure in the working chamber 13 rises in relation to the pressure in the working chamber 14. At a predetermined pressure difference the pressure prevailing in the working chamber 13 acts upon the differential area between the valve head 25 and the valve stem 27 with such force that the valve body 18 is displaced upwards until its conical transition surface 26 comes into the region of the sealing ring 21. Then the by-pass connection 19c, 19, 20 is again open and the piston rod 9 can be drawn out of the cylinder.

In application to the construction according to FIG. 1, this signifies that 1. on actuation of the release device 7 the door can easily be displaced and made fast again at any time;

2. if without actuation of the release device 7 the door is pivoted with great force in the one or the other direction, the by-pass connection 19c, 19, 20 is likewise opened, so that damage cannot occur either to the setting device nor to the door. If no more force is applied to the door, the condition according to FIG. 3 automatically re-establishes itself.

By way of example the release device 7 can be coupled with the door handle so that the by-pass connection 19c, 19, 20 is necessarily opened on action upon the door handle (not shown).

In the upper end region of the cylinder 8 longitudinal grooves 23 are provided, as visible from FIG. 2, which can by-pass the piston unit 10 as soon as the piston unit approaches the upper end position, that is that end position which corresponds to an approximately closed door according to FIG. 1. Then the piston unit 10 is displaceable in relation to the cylinder 8 even without opening of the by-pass connection 19c, 19, 20. The action of the setting device is therefore substantially eliminated when the door is closed.

Figure 4:
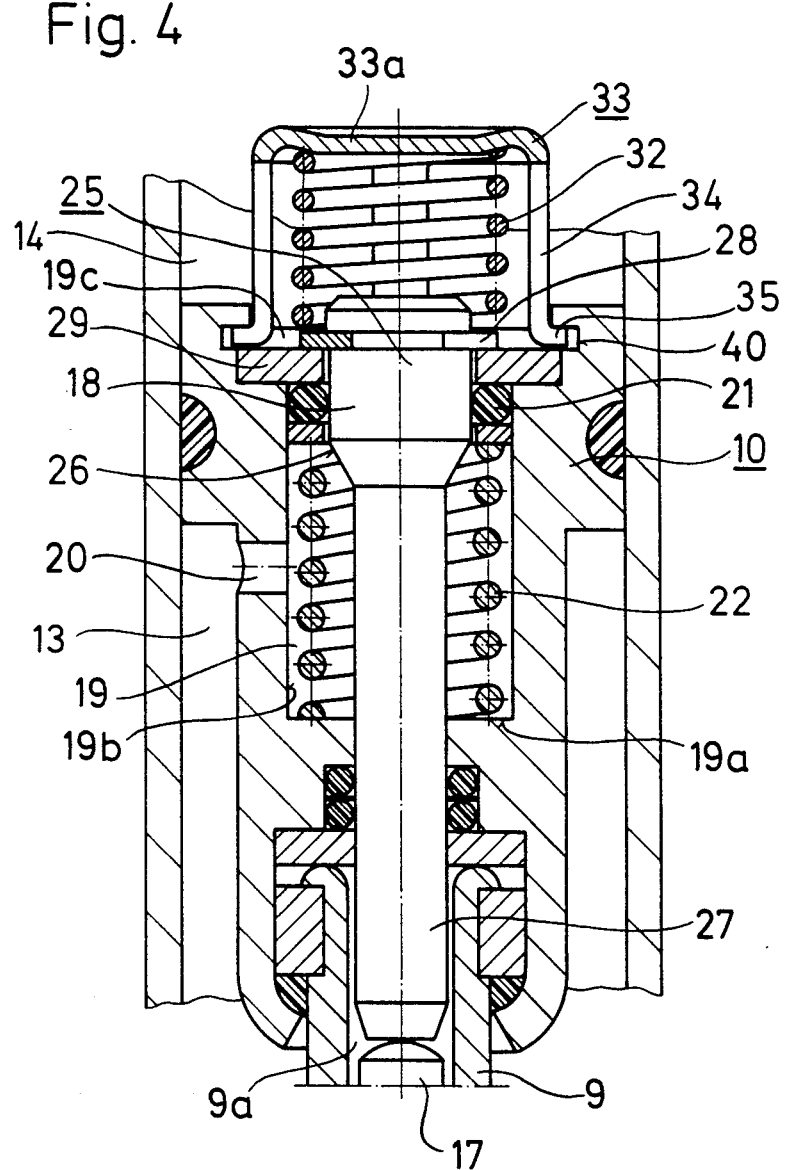
FIG. 4 shows a form of embodiment similar to that in FIG. 3, where a valve spring is acting upon the valve body.

In FIG. 4 a further form of embodiment is shown in which a valve spring 32 acts upon the ring 28 and thus upon the valve head 25. This valve spring 32 is supported on the end piece 33a of a cage 33. The cage 33 possesses axially directed tongues 34 with radial projections 35. These radial projections 35 engage in a groove 40 of the valve unit 10 so that the cage 33 for one part and the stop ring 29 for the other part are secured on the valve unit 10. With the aid of the valve spring 32 the response pressure in the working chamber 13 at which the by-pass connection 19c, 19, 20 is opened by upward displacement of the valve body 18, can be varied. For this purpose it is necessary only to use different valve springs 32. Moreover the construction according to FIG. 4, thanks to the valve spring 32, is especially suitable for those cases where the pressure in the working chambers 13 and 14 is relatively slight, so that the biasing action downward upon the valve body 18 is slight.

The sealing spring 22 can also be selected as desired. Thus it is also possible to adjust the response pressure in the working chamber 14 at which the by-pass connection 19c, 19, 20 is opened by downward displacement of the sealing ring 21.

Specific forms of embodiment of the invention have been represented and described in order to illustrate the use of the principles of the invention. Of course the invention can also be realised in other ways without departing from these principles.

The references in the Claims serve only for facilitation of understanding and are not to be understood as a limitation.

I claim:

1. Steplessly blockable setting device comprising a cylinder (8) with a cylinder axis, a cavity (13, 14), a cylinder inner surface (8a) and two end walls, a piston rod (9) conducted in sealing manner through at least one (11, 12) of the end walls, which rod is movable in the direction of the cylinder axis in relation to the cylinder (8), a piston unit (10) connected within the cylinder (8) with the piston rod (9), which unit rests in sealing manner on the cylinder inner surface (8a) and divides the cavity (13, 14) within the cylinder (8) into two working chambers (13, 14), a fluid filling in the working chambers (13, 14), a by-pass connection (19c, 19, 20) which connects the two working chambers (13, 14) with one another, and a shut-off valve arrangement (25, 21) actuatable from the exterior of the cylinder (8) in the by-pass connection (19c, 19, 20), wherein the by-pass connection (19c, 19, 20) is openable in response to excess pressure in each of the two working chambers (13, 14), respectively.

2. Steplessly blockable setting device comprising a cylinder (8) with a cylinder axis, a cavity (13, 14), a cylindrical inner surface (8a) and two end walls, a piston rod (9) conducted in sealing manner through at least one (11, 12) of the end walls, which rod is movable in the direction of the cylinder axis in relation to the cylinder (8), a piston unit (10) connected with the piston rod (9) to form a construction group (9, 10), which unit rests in sealing manner on the cylinder inner surface (8a) and divides the cavity (13, 14) within the cylinder (8) into two working chambers (13, 14), a fluid filling in the working chambers (13, 14), a by-pass connection (19c, 19, 20) which connects the two working chambers (13, 14) with one another, and a shut-off valve arrangement (18, 21), actuatable from the exterior of the cylinder (8), in the by-pass connection (19c, 19, 20), characterised in that a valve chamber (19) with a valve chamber axis and a valve chamber circumferential surface (19b) is provided, in that a valve body (18) is accommodated coaxially with and displaceably in the valve chamber (19), in that this valve body (18) comprises a valve head (25) with an external circumferential surface of larger diameter and a prolongation (26, 27) with an external circumferential surface of smaller diameter, in that radially between the valve body (18) and the valve chamber circumferential surface (19b) a sealing ring unit (21) is arranged which rests in sealing manner on the valve chamber circumferential surface (19b), in that the valve body (18) is axially biased into a basic position determined by a valve stop (29) in that the sealing ring unit (21) is axially biased into a basic position determined by a sealing stop (29), in that when the valve body (18) and the sealing ring unit (21) are in the basic positions the valve head (25) rests in sealing manner with its external circumferential surface on the sealing ring unit (21), in that the valve body (18) is displaceable out of its basic position into an opening position in which the external circumferential surface of the prolongation (26, 27) has approached the sealing ring unit (21) and in that the sealing ring unit (21) is displaceable out of its basic position into an opening position in which it has approached the external circumferential surface of the prolongation (26, 27).

3. Steplessly blockable setting device according to claim 2, characterised in that the valve body (18) is shiftable out of its basic position by external force action.

4. Steplessly blockable setting device according to claim 2, characterised in that the valve body (18) is shiftable out of its basic position by a predetermined excess pressure in one (13) of the working chambers (13, 14).

5. Steplessly blockable setting device according to claim 2, characterised in that the sealing ring unit (21) is shiftable out of its basic position by excess pressure in one (14) of the working chambers (13, 14).

6. Steplessly blockable setting device according to claim 2, characterised in that the valve body (18) is loaded in the direction towards its basic position by the pressure in one (14) of the working chambers (13, 14).

7. Steplessly blockable setting device according to claim 2, characterised in that the valve body (18) is loaded by a valve spring (32) in the direction towards its basic position.

8. Steplessly blockable setting device according to claim 2, characterised in that the sealing ring unit (21) is loaded by the pressure in one (13) of the working chambers (13, 14) in the direction towards its basic position.

9. Steplessly blockable setting device according to claim 2, characterised in that the sealing ring unit (21) is loaded by a sealing spring (22) in the direction towards its basic position.

10. Steplessly blockable setting device according to claim 2, characterised in that the prolongation (26, 27) possesses a conical transition section (26) and a valve stem (27).

11. Steplessly blockable setting device according to claim 2, characterised in that the valve chamber (19) is connected with one (13) of the working chambers (13, 14), in that the sealing ring unit (21) is loaded on one side in the direction towards its basic position by the pressure in the valve chamber (19) and on its other side is subjected to the pressure in the other (14) of the two working chambers (13, 14) and in that the valve head (25) is subjected outside the valve chamber (19) to the pressure in the other (14) of the working chambers (13, 14) and is loaded by this pressure in the direction towards its basic position.

12. Steplessly blockable setting device according to claim 11, characterised in that a sealing spring (22) loading the sealing ring unit (21) in the direction towards its basic position is accommodated in the valve chamber (19).

13. Steplessly blockable setting device according to claim 2, characterised in that a valve spring (32) acts upon the valve head (25) outside the valve chamber (19) and loads the valve body (18) in the direction towards its basic position.

14. Steplessly blockable setting device according to claim 13, characterised in that the valve spring (32) is supported by a cage (33) in relation to a structure body (10) accommodating the valve chamber (19).

15. Steplessly blockable setting device according to claim 14, characterised in that the cage (33) is made in pot style with a pot bottom (33a) and with axially directed spring tongues (34), in that on the spring tongues (34) there are provided radial projections (35) which are sprung into a ring groove (40) of the structure body (10) and in that the valve spring (32) bears on the pot bottom (33a).

16. Steplessly blockable setting device according to claim 15, characterised in that a stop ring (29), which forms both the valve body stop and the sealing ring stop, is fixed by the cage (33) in relation to the structure body (10).

17. Steplessly blockable setting device according to claim 2, characterised in that the prolongation (26, 27) penetrates a bottom (19a) of the valve chamber (19) in sealing manner and in that an end of the prolongation (26, 27) placed outside the valve chamber (19) is subjected to a pressure independent of the pressure in the working chambers (13, 14).

18. Steplessly blockable setting device according to claim 17, characterised in that the end of the prolongation (26, 27) placed outside the valve chamber (19) is subjected to atmospheric pressure.

19. Steplessly blockable setting device according to claim 2, characterised in that the valve chamber (19) is accommodated coaxially within the construction group (9, 10).

20. Steplessly blockable setting device according to claim 2, characterised in that the piston rod (9) comprises a bore (9a) and in that in this bore there is accommodated a release plunger (17) which is in engagement with the valve body (18).

21. Steplessly blockable setting device according to claim 2, characterised in that the piston rod (9) is conducted only through one end wall (11, 12) and in that the fluid in the working chambers (13, 14) is under pressure.

22. Steplessly blockable setting device according to claim 21, characterised in that a liquid volume is accommodated within the working chambers (13, 14) and in that the liquid volume is separated by a separator piston (15) from a compressed-gas volume.

* * * * *